April 14, 1931.  I. SAKS  1,801,056
PISTON AND PISTON RING
Filed June 9, 1928
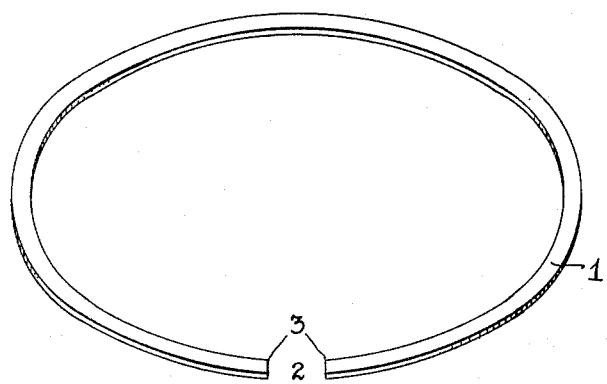
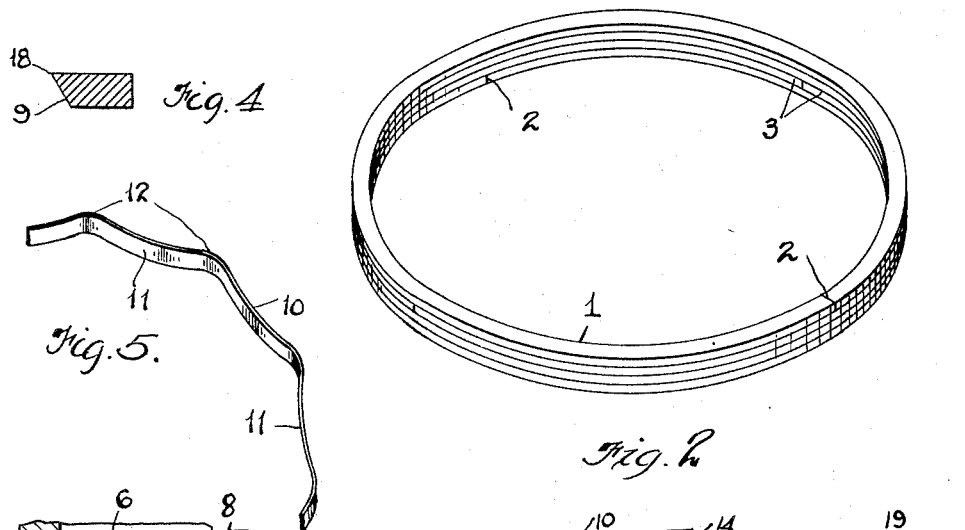
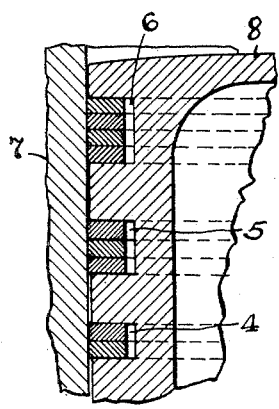
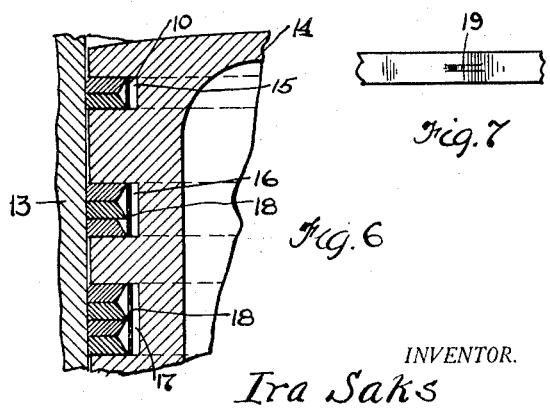
INVENTOR.
Ira Saks
BY
Day, Oberlin & Day
ATTORNEYS.

Patented Apr. 14, 1931

1,801,056

UNITED STATES PATENT OFFICE

IRA SAKS, OF CLEVELAND HEIGHTS, OHIO

PISTON AND PISTON RING

Application filed June 9, 1928. Serial No. 284,074.

This invention, relating, as indicated, to pistons and piston rings, has for its principal object the provision of standardized ring sections of such dimensions that two or more thereof can be superposed to form multiple or compound rings having thicknesses which adapt them for fitting any one of several grooves of different sizes.

At the present time, piston rings are made in a large number of different sizes; in fact, rings of standard and oversized diameters are made in all of the common thicknesses, namely, one-eighth of an inch, three-sixteenths of an inch and one-fourth of an inch, and these different sizes must be kept available by dealers in order to supply the demand for rings having specified thicknesses and diameters. Such large stocks represent a considerable investment, and since some sizes are more in demand than others, those sizes which are not often required mean an expenditure upon which no immediate return can be expected. To reduce the number of sizes or rings of different thicknesses which it is necessary for manufacturers to make and dealers to carry in stock, I have provided an improved piston ring consisting of a plurality of standardized sections, each of which has a thickness that bears a similar whole number relation to all of the normal piston groove widths in common use. These sections, when superposed in the required number, are adapted to form compound or multiple rings having total thicknesses corresponding to the particular piston grooves which they are intended to fit and identical with the thickness of the integrally formed rings which they are designed to replace. Also, I have provided, for use in re-turned or oversized piston grooves, a ring section of super-normal thickness, this section being adapted, when combined with one or more sections of normal thickness, to form a compound ring having a total thickness that exceeds the width of a normal or standard groove by the amount which the enlarged groove exceeds the normal groove in width, namely, one thirty-second of an inch. When rings of my improved design are employed in combination with an expander, my invention contemplates chamfering or beveling one of the inner edges of each section in order to provide inclined surfaces against which the expander may operate to force all sections radially into contact with the cylinder wall and the outer sections into close contact with the sides of a piston groove, thus insuring against leakage and avoiding eccentric wear of the cylinder wall and rings due to unequal or improperly distributed pressure.

To the accomplishment of the foregoing and related ends, said invention, then, consists of the means hereinafter fully described and particularly pointed out in the claims; the annexed drawings and the following description setting forth in detail certain structure embodying the invention, such disclosed means constituting, however, but one of various mechanical forms in which the principle of the invention may be used.

In said annexed drawings:—

Fig. 1 is a perspective view of a single unchamfered ring section of the kind contemplated by my invention; Fig. 2 is a perspective view of a compound ring made up of superposed sections of the type shown in Fig. 1; Fig. 3 is a fragmentary vertical section illustrating the use of rings of the type shown in Figs. 1 and 2 in combinations of different numbers; Fig. 4 is a transverse section showing a chamfered ring section for use in connection with an expander; Fig. 5 is a fragmentary plan view of an expander suitable for use with rings compounded of sections of the kind shown in Fig. 4; Fig. 6 is a view similar to Fig. 3 and illustrates the use of chamfered rings in combination with expanders of the kind shown in Fig. 5; and Fig. 7 is a fragmentary elevation of a modified expander for use in connection with compound rings made up of three or more chamfered sections.

In the drawings, and with particular reference to Figs. 1 and 2, my invention is shown as comprising a split ring-section 1, a single section being shown in the former view and a ring compounded of four such sections in the latter view. In order to minimize leakage, the cracks 2 between the ends 3 of each section are preferably distributed circumferentially as shown in Fig. 2, this being done when the rings are installed in the piston grooves and the indicated arrangement maintained by friction between the ring sections or in any desired positive manner. Since piston grooves, especially those employed in the pistons of automobile engines and the like, are usually one-eighth of an inch, three-sixteenths of an inch or one-fourth of an inch in width, my invention contemplates that the ring sections 1 shall be one-sixteenth of an inch in thickness, this magnitude bearing a similar whole number relation to all of said groove widths and, therefore, insuring that such sections, when superposed in the required number, will form a multiple ring having the same thickness as the particular integral ring which it is designed to replace and dimensions adapting it to interfit with a particular piston groove having one of the above-mentioned widths. Thus: to of these uniform sections, when superposed, will form a compound ring having an aggregate thickness of one-eighth of an inch and will replace an integrally formed ring of similar dimensions; three sections will replace an integral ring having a thickness of three-sixteenths of an inch; four will replace an integral ring having a thickness of one-fourth of an inch, etc., all common sizes being obtainable by simply compounding the required number of individual sections. These sectional rings, in addition to making it possible for manufacturers and dealers to supply all commonly desired sizes from a limited and fluid stock requiring a comparatively small investment, also have other advantageous features; for example, they provide a multiplicity of edges for scraping oil from the cylinder walls; they provide an increased number of contacts with such walls; their flexibility, due to reduced thickness, allow them to conform to slightly eccentric or out-of-round cylinders; and, the cracks between the sections enable them to retain, by capillary attraction and adhesion, a quantity of lubricant sufficient in amount to prevent leakage past their working faces and around their inner sides within the grooves.

In Fig. 3, several of my improved compound rings of different thicknesses and numbers of sections, are shown positioned within cylinder groves 4, 5 and 6, there being a ring compounded of two sections in the groove 4, a ring compounded of three sections in the groove 5 and, a ring compounded of four sections in the groove 6, all operating against a cylinder wall 7 and carried by a piston 8. If desired, expanders of the kind hereinafter described, or of any other approved design can be used behind such rings as have just been explained but, for use in combination with expanding devices, I prefer a special ring of the type shown in Fig. 4.

As above stated, for use in connection with expanding devices, I prefer ring sections which are provided with a chamfer or bevel 9 (Fig. 4). Such sections, when superposed, present inclined faces against which the edges of the expanding rings operate to force the ring as a whole radially into contact with the walls of the cylinder and the outer sections into contact with the sides of the piston groove, thereby further providing against leakage, positively forcing the ring into contact with the cylinder even though slightly eccentric or out-of-round, obviating the hitherto existing necessity for making and stocking oversized rings for worn cylinders (the thinness of the ring sections allows them, when urged outwardly by the expanders, to enlarge sufficiently to fit oversized cylinders) and, avoiding such objectionable operating defects as crank case oil dilution, due to leakage of fuel around the piston and its grooves.

Fig. 5 illustrates an expander of a type adapted for use in combination with my improved chamfered rings, and this expander consists of an open annulus of spring steel 10 or the like which is bent, in the manner indicated, to form a plurality of substantially arcuate parts having ends 11 for seating on the rear wall of the groove and central arched parts 12 for coaction with the inner sides of the rings. Fig. 6 shows a cylinder 13, within which operates a piston 14 having a number of ring grooves 15, 16 and 17 carrying compound rings of the kind shown in Fig. 4 and expanders of the type shown in Fig. 5. The sharp edges 18 formed by the chamfers 9, when more than two rings are used in combination, will cut into the arched parts 12 of the expanders after a short period of use and so allow the expanders to have a positive contact with all sections but, if desired, the parts 12 of the expanders may be scored or indented to form grooves or depressions 19 adapted for initially receiving the apexes of the central ring sections, one circumferential series of indentations being provided for rings consisting of three sections and two spaced series for use with rings consisting of four sections where the middle rings are arranged with their two chamfered faces, or one chamfered and one plane face in proximity, or with a single series where the plane faces of the central sections are in contact, (see Fig. 7).

When piston grooves become worn, it is the practice to re-turn and enlarge them sufficiently to accommodate rings of greater thickness. The oversized rings used in such enlarged grooves have a thickness which exceeds the normal ring thickness by one thirty-second of an inch. With the object of adapting my improved ring sections for use in enlarged grooves, I provide, for each diameter, a ring section having a thickness of three thirty-seconds of an inch, these sections, when combined with other sections of normal thickness, making it possible to fit grooves having widths of five thirty-seconds of an inch, seven thirty-seconds of an inch and nine thirty-seconds of an inch, these being the enlarged grooves corresponding respectively to the normal or standard grooves having width one thirty-second of an inch smaller. Also these enlarged ring sections make it possible to fit some odd-sized grooves, that is, grooves that have widths differing from the standard grooves and their common enlargements.

From the foregoing description, it will be apparent that my invention provides standardized ring sections of uniform thickness which can be compounded with other similar or enlarged sections to fit a wide range of piston grooves of normal and enlarged widths, only two thicknesses, one-sixteenth of an inch and three thirty-seconds of an inch, in the common diameters, being necessary to fit all standard grooves and their ordinary enlargements. It will also be apparent that my improved rings are adapted for use in connection with expanders and that, when so used, means are provided for positively thrusting all sections radially and the outer sections in a direction at right angles to the piston diameter against the sides of the piston groove.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In combination, a piston ring comprising a plurality of sections and a crimped expander for said sections, the crimps thereof forming apexes, said expander having recesses in its apexes adapted to receive parts of said sections.

2. In combination, a piston ring comprising a plurality of chamfered sections and an expander for coacting with such sections, said expander having indentations for receiving the chamfered parts of said sections.

3. In combination, a piston ring comprising a plurality of uniform chamfered sections which have thicknesses that bear similar whole number relations to a plurality of actual piston ring grooves, and an expander for coacting with the chamfered parts of said sections.

Signed by me, this 5th day of June, 1928.

IRA SAKS.